(12) United States Patent
Iwamura et al.

(10) Patent No.: US 8,560,631 B2
(45) Date of Patent: Oct. 15, 2013

(54) STORAGE SYSTEM

(75) Inventors: Takashige Iwamura, Tokyo (JP);
Yasutomo Yamamoto, Tokyo (JP);
Yoshiaki Eguchi, Tokyo (JP); Hiroshi Arakawa, Tokyo (JP); Kouji Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1558 days.

(21) Appl. No.: 11/772,710

(22) Filed: Jul. 2, 2007

(65) Prior Publication Data

US 2007/0283366 A1   Dec. 6, 2007

Related U.S. Application Data

(63) Continuation of application No. 10/224,091, filed on Aug. 19, 2002, now Pat. No. 7,254,620.

(30) Foreign Application Priority Data

Jun. 3, 2002   (JP) ................................. 2002-161713

(51) Int. Cl.
*G06F 15/16*   (2006.01)

(52) U.S. Cl.
USPC ........................................................ 709/217

(58) Field of Classification Search
USPC ........................................................ 709/217
See application file for complete search history.

(56) References Cited

U.S. PATENT DOCUMENTS

| | | | |
|---|---|---|---|
| 5,644,766 A * | 7/1997 | Coy et al. ............................... | 1/1 |
| 5,742,792 A | 4/1998 | Yanai et al. | |
| 5,956,750 A | 9/1999 | Yamamto et al. | |
| 5,987,506 A | 11/1999 | Carter et al. | |
| 6,044,444 A | 3/2000 | Ofek et al. | |
| 6,073,209 A | 6/2000 | Bergsten | |
| 6,078,232 A | 6/2000 | Saito | |
| 6,108,748 A | 8/2000 | Ofek et al. | |
| 6,145,066 A | 11/2000 | Atkin | |
| 6,220,768 B1 | 4/2001 | Barroux | |
| 6,324,581 B1 | 11/2001 | Xu et al. | |
| 6,324,654 B1 | 11/2001 | Wahl et al. | |
| 6,341,356 B1 | 1/2002 | Johnson et al. | |

(Continued)

FOREIGN PATENT DOCUMENTS

| | | |
|---|---|---|
| JP | 09-218840 A | 8/1997 |
| JP | 09-274544 A | 10/1997 |

(Continued)

OTHER PUBLICATIONS

Japan Patent Office (JPO) office action dated forJPO patent application 2007-240813 (Jun. 10, 2008).

(Continued)

*Primary Examiner* — Hussein Elchanti
*Assistant Examiner* — Maceeh Anwari
(74) *Attorney, Agent, or Firm* — Kilpatrick Townsend & Stockton LLP

(57) ABSTRACT

When a logical volume in a first storage box is transferred to a second storage box, information of an access object such as a network communication protocol possessed by a host which communicates with the first storage box is changed to change a network route for accessing the transferred logical volume. Logical volume transfer is notified from the first storage box to the host by using an ICMP Redirection Error message or the ARP protocol.

16 Claims, 14 Drawing Sheets

(56) References Cited

U.S. PATENT DOCUMENTS

| | | | |
|---|---|---|---|
| 6,378,039 B1 | 4/2002 | Obara et al. | |
| 6,442,601 B1 | 8/2002 | Gampper et al. | |
| 6,487,591 B1 | 11/2002 | Budhraja et al. | |
| 6,499,056 B1 | 12/2002 | Kitamura et al. | |
| 6,535,967 B1 | 3/2003 | Milillo et al. | |
| 6,578,160 B1 | 6/2003 | MacHardy et al. | |
| 6,640,278 B1 | 10/2003 | Nolan et al. | |
| 6,640,291 B2 | 10/2003 | Fujibayashi et al. | |
| 6,681,303 B1 | 1/2004 | Watanabe et al. | |
| 6,763,442 B2 | 7/2004 | Arakawa et al. | |
| 6,766,430 B2 | 7/2004 | Arakawa et al. | |
| 6,829,720 B2 | 12/2004 | Schoenthal et al. | |
| 6,865,617 B2 | 3/2005 | Zeider et al. | |
| 6,976,103 B1 * | 12/2005 | Watanabe et al. | 710/74 |
| 7,707,263 B1 * | 4/2010 | Cramer et al. | 709/212 |
| 2001/0000818 A1 | 5/2001 | Nagasawa et al. | |
| 2001/0011324 A1 | 8/2001 | Sakaki et al. | |
| 2001/0047448 A1 | 11/2001 | Sueoka et al. | |
| 2001/0054133 A1 * | 12/2001 | Murotani et al. | 711/114 |
| 2002/0019922 A1 | 2/2002 | Reuter et al. | |
| 2002/0049825 A1 | 4/2002 | Jewett et al. | |
| 2003/0101109 A1 | 5/2003 | Kaneda et al. | |
| 2003/0212854 A1 | 11/2003 | Kitamura et al. | |
| 2003/0225861 A1 | 12/2003 | Iwamura et al. | |

FOREIGN PATENT DOCUMENTS

| | | |
|---|---|---|
| JP | 11-085576 A | 3/1999 |
| JP | 2000-132343 A | 5/2000 |
| JP | 2000-293317 A | 10/2000 |
| JP | 2001-067187 A | 3/2001 |
| JP | 2001-125815 A | 5/2001 |
| JP | 2001-134616 A | 5/2001 |
| JP | 2001-331355 A | 11/2001 |
| JP | 2002-082775 A | 3/2002 |
| JP | 2002-185464 A | 6/2002 |
| JP | 2003-534749 A | 11/2003 |
| WO | WO01/90902 A1 | 11/2001 |

OTHER PUBLICATIONS

Japan Patent Office (JPO) office action for JPO patent application JP2007-23884 (Jan. 26, 2010).

* cited by examiner

DATA AMOUNT

1 [GB/s]

2 [GB/s]

4.5 [GB/s]

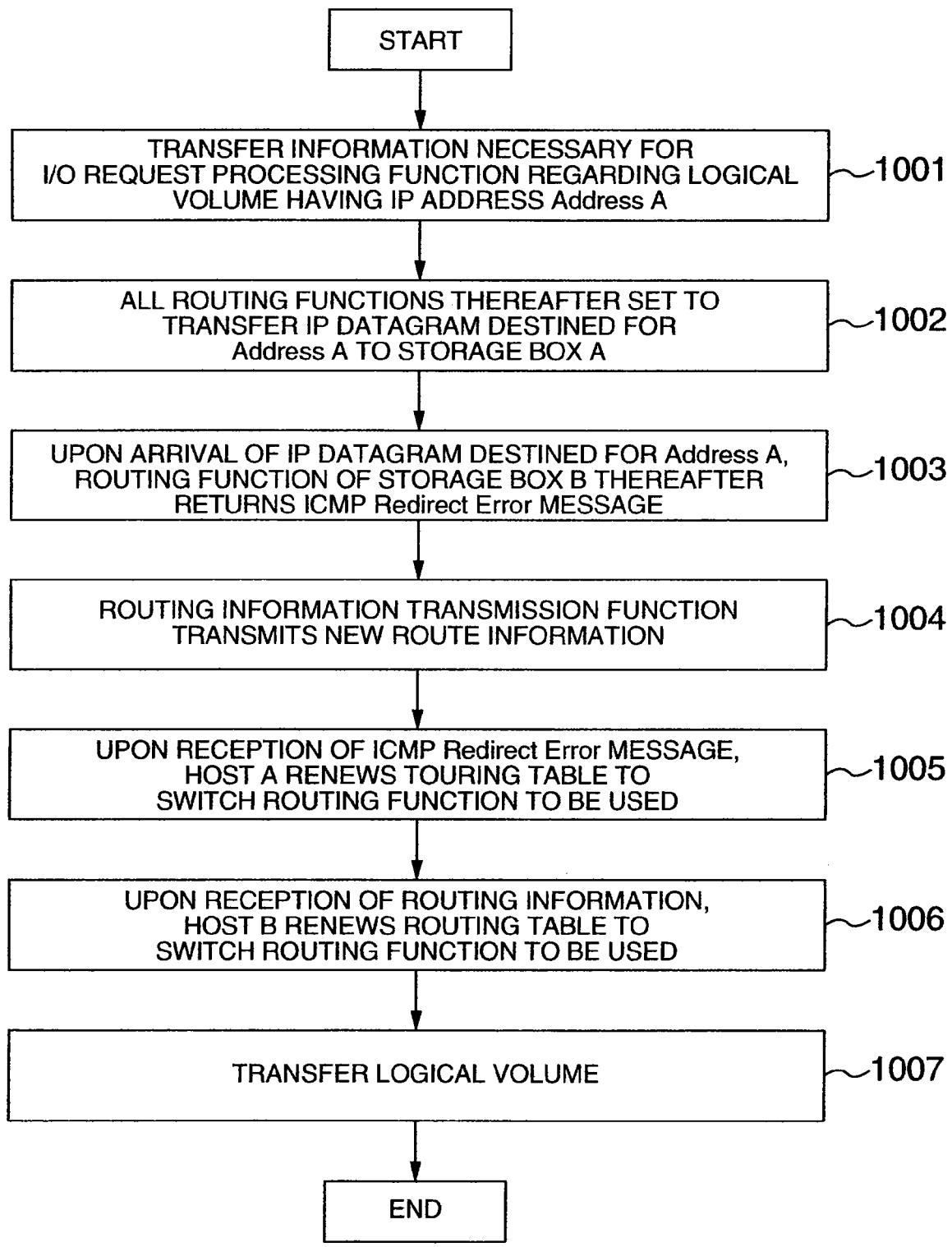

STORAGE SYSTEM

BACKGROUND OF THE INVENTION

The present invention relates to a storage system constituted of a plurality of storage sub-systems connected to computers via networks.

High reliability and high performance of a large scale storage system are required more and more nowadays. As a method of configuring a large scale storage system satisfying such user requirements, a plurality of storage sub-systems (hereinafter also called a "storage box") are interconnected by an internal network and controlled independently. For example, as one practical implementation of a storage system, storage boxes are interconnected by a high speed private network and an I/O forward function is provided to forward an I/O request between storage boxes, so that a host can regard this system as one large scale storage system. If an I/O request received from a host is a request to another storage box, the I/O forward function communicates with the other storage box and returns a necessary message back to the host.

As a second method, storage boxes are interconnected not by a private network but by a general network via which an I/O request from a host is transmitted, to provide the I/O forward function.

iSCSI (Internet Small Computer System Interface) is expected as a protocol for configuring such a storage system, the specifications of iSCSI being stipulated by the IETF (Internet Engineering Task Force).

iSCSI is a protocol which performs an I/O process such as data storage by transferring a SCSI command and the like over a network whose communications are performed by the TCP/IP protocol. An ETHERNET™ device, which is a typical network device capable of using the TCP/IP protocol, can be installed at lower cost than Fibre Channel presently used in a storage network. If iSCSI prevails, hosts and storage sub-systems larger in number than those of a storage network connected by Fibre Channel can be interconnected.

Patent Publication JP-A-2000-293317 discloses a method of detecting a load state of each part in a storage sub-system and avoiding load concentration.

SUMMARY OF THE INVENTION

Although this Publication describes the method of avoiding access concentration upon an internal disk of a storage sub-system, it does not consider access concentration upon a large scale storage system. In a large scale storage system, since a number of hosts may transmit I/O requests at the same time, loads are concentrated upon particular channel processors, parity groups and the like so that the I/O performance may be degraded. With the method disclosed in the Publication, although load concentration upon an internal parity group of a storage sub-system can be avoided, unbalanced loads of storage sub-systems cannot be avoided.

In a network interconnecting storage boxes as used by the I/O forward function, all storage boxes are interconnected as a rule. Therefore, if data is transferred always over a network between storage boxes, communications over this network become a performance bottleneck and the performance is degraded.

The invention has been made in order to solve the above problems. It is an object of the present invention to provide a large scale storage system constituted of a plurality of storage boxes and having a function of avoiding unbalanced loads of storage boxes.

In the storage system of this invention connected to one or more computers via a network and configured by a plurality of storage sub-systems storing access objects of the computers, an access object stored in a first storage sub-system is transferred to a second storage sub-system, information of the access object stored in the computer is altered to change a network route to the transferred access object from the first storage sub-system to the second storage sub-system in a manner independently for each computer.

Information exchange between a storage system and a host to change the network route between the storage system and the host may use an ICMP Redirect Error message or an ARP protocol.

For example, in the system using iSCSI, information of an access object stored in a computer may be information of the IP protocol, information of SCSI and the like.

Other objects, features and advantages of the invention will become apparent from the following description of the embodiments of the invention taken in conjunction with the accompanying drawings.

BRIEF DESCRIPTION OF THE DRAWINGS

FIG. 5 is a flowchart illustrating the storage control method.

DESCRIPTION OF THE EMBODIMENTS

(I) Structure of Storage System of Embodiment

First, the structure of a storage system according to an embodiment of the invention will be described with reference to FIGS. 1 and 2.

Figure 1:
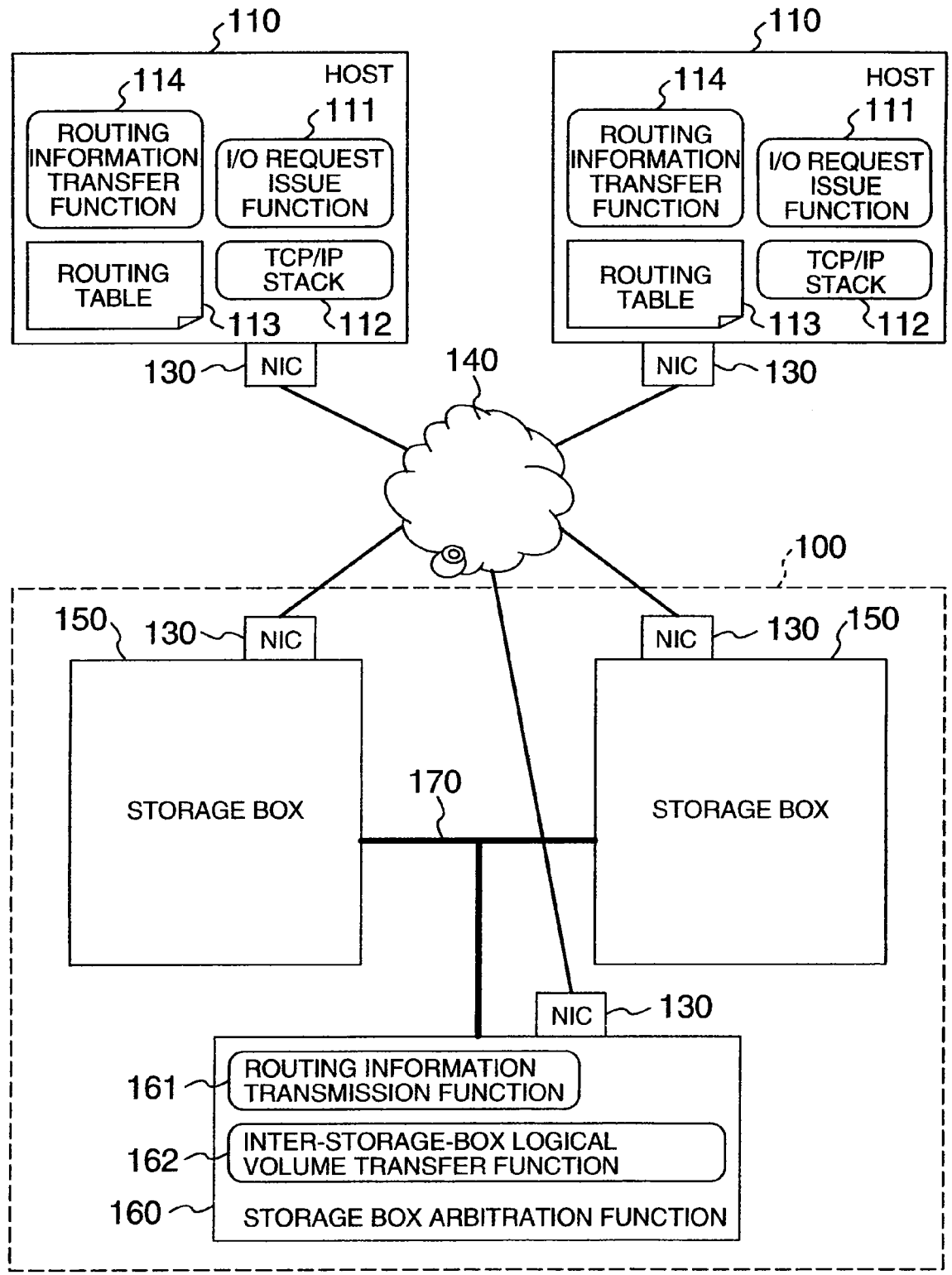
FIG. 1 is a diagram showing the overall structure of an information processing system using a storage system according to an embodiment of the invention.

As shown in FIG. 1, an information processing system using the storage system of the embodiment has one or more hosts 110 and a storage system 100, respectively connected to a storage network 140.

The storage network 140 may be a network constituted of a plurality of physical network devices of a plurality of kinds, a wide area network or the like of any network topology.

The storage system 100 and host 110 are interconnected by the storage network 140 via NICs (Network Interface Cards) 130. A communication protocol to be used between the host 110 and storage system 100 is typically the TCP/IP protocol. An iSCSI protocol may be used as a protocol inclusive of a storage I/O.

In the storage system 100, a plurality of storage boxes 150 and a storage box arbitration function 160 are connected by an inner storage network 170.

The storage box 150 is a storage sub-system having a function of storing data or returning data by itself in response to an I/O request from the host 110.

The inner storage network 170 interconnects the storage boxes 150 and storage box arbitration function 160. The inner storage network 170 may be the storage network 140 interconnecting the hosts 110 and storage system.

The storage box arbitration function 160 includes a routing information transmission function 161 and an inter-storage-box logical volume transfer function 162. The storage box arbitration function 160 may be realized by an inner processor of the storage system 100 as shown in FIG. 1 or by an external computer of the storage system.

The routing information transmission function 161 transmits TCP/IP routing information to be referred to by the hosts 110 and storage boxes 150. A protocol for transmitting the TCP/IP routing information may be RIP or OSPF. Examples of realizing this function may be "routed" and "gated" of computer programs such as in UNIX (a registered trademark of The Open Group) or others. The routing information transmission function 161 may have a capability of receiving routing information transmitted from an external.

The inter-storage-box logical volume transfer function 162 controls the whole storage system to transfer logical volumes among storage boxes.

The host 110 is a computer having a TCP/IP stack 112, an I/O request issue function 111, a routing information transfer function 114, and a routing table 113. Although not shown, the host 110 also has components of a general computer, such as a processor and a memory.

The TCP/IP stack 112 provides a communication function in conformity with the TCP/IP protocol.

The I/O request issue function 111 is a function of issuing an I/O request in conformity with the iSCSI protocol to the storage system 100.

The routing information transfer function 114 is a function of receiving TCP/IP routing information transmitted from the storage system 100, a router, another host 110 and the like, and transmitting routing information.

The routing table 113 contains routing information necessary for communications by the TCP/IP stack 112.

Next, the structure of the storage box 150 will be described with reference to FIG. 2.

Figure 2:
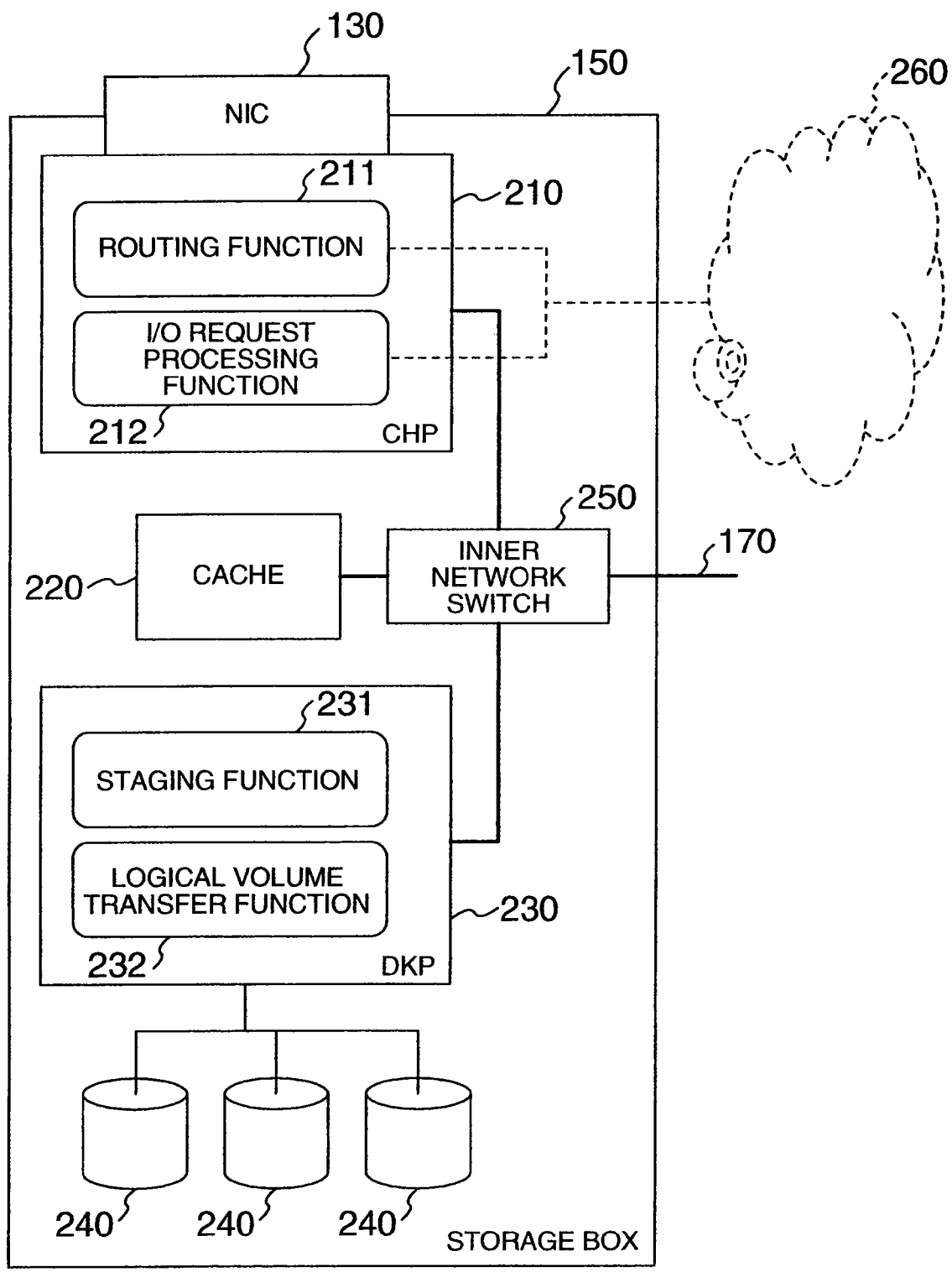
FIG. 2 is a diagram showing the structure of a storage box constituting the storage system according to the embodiment of the invention.

As shown in FIG. 2, the storage box 150 has a NIC 130, a cache 220, a CHP (CHannel Processor) 210, a DKP (DisK Processor) 230 and storage devices 240. CHP 210, DKP 230 and cache 220 are interconnected by an inner network switch 250. The inner storage network 170 is configured by interconnecting inner network switches 250 of a plurality of storage boxes 150.

In FIG. 2, although CHP 210, cache 220 and DKP 230 are interconnected by the inner network switch 250, they may be interconnected by a bus or the like. In this case, the inner network switch 250 may be connected only to a processor (in FIG. 2, CHP 210) having a routing function 211 and an I/O request processing function 212.

The storage network 140 may be used as a substitute for the functions of the inner network switches 250 and inner storage network 170.

The storage box 150 has one or more storage devices 240. The storage device 240 has a storage area corresponding a storage area supplied to the host as a logical volume. The storage device 240 is mainly a magnetic disk from the viewpoint of a current storage system. However, the storage device 240 may be an optical disk, a compact disk, a DVD or the like.

CHP 210 is a processor for processing an I/O request received via NIC 130, and includes the routing function 211 and I/O request processing function 212. CHP 210 of each storage box is connected to other CHPs 210 of other storage boxes by a network constituted of a CHP TCP/IP network 260 in the storage system. The CHP TCP/IP network 260 is a network interconnecting the I/O request processing functions 212 and routing functions 211 of respective CHPs 210 by the TCP/IP protocol.

The routing function 211 is a function of routing a TCP/IP packet by an IP router interconnecting the storage network 140 and CHP TCP/IP network 260.

The I/O request processing function 212 is a function of processing an I/O request transmitted from the host. The I/O request processing function 212 interprets an SCSI command sent by the TCP/IP protocol and iSCSI protocol, reads data from and writes data to the cache in order to process the SCSI command, and requests a staging function 231 of DKP 230 to perform a staging process or de-staging process. The staging process is a process of transfer data in the storage device 240 to the cache, whereas the de-staging process is a reverse process of the staging process.

When the I/O request processing function 212 performs data read/write of the cache 220 or requests the staging function 231 to perform data read/write, the address of data may be either a physical address of the storage device 240 and its block or a logical address.

The CHP TCP/IP network 260 may be realized by using the inner storage network 170. CHPs 210 may be interconnected directly by a network. The storage network 140 may be used as the CHP TCP/IP network 260.

DKP 230 is a processor for performing an I/O process of the storage device 240 and has the staging function 231 and a logical volume transfer function 232. The staging function 231 is a function of performing the staging process or de-staging process relative to the cache 220. DKP 230 performs a process necessary for collectively using a plurality of storage devices as a parity group. In addition, DKP 230 may perform a replication process and the like. The staging function 231 provides information necessary for translating a logical address into a physical address of a storage device and its block which stores actual data.

The logical volume transfer function 232 is a function of transferring data in the storage device 240 supplied as a logical volume which is an access unit from the host 110 to another storage device 240 including the storage device 240 of another storage box 150. The logical volume transfer function 232 may transfer data in the cache among storage boxes 150 when the logical volume is transferred.

Specific transfer methods will be described. In one method, the I/O process is temporarily stopped and all data in the logical volume is copied. After the copy, information necessary for translating the logical address possessed by the staging function 231 into the physical address of the storage device and its block storing actual data is renewed and then the I/O process is resumed. In another method which can expect a shortened I/O process stop time, as a pre-process, all data of the logical volume is copied without stopping the I/O process. Thereafter, by temporarily stopping the I/O process, data changed by data write after the start of the pre-process is reflected upon a data transfer destination. By using other methods or different timings, the logical volume may be transferred or the information possessed by the staging function 231 may be renewed. In this embodiment, although the storage box 150 has two processors, a single processor or three or more processors may also be used if the routing function 211, I/O request processing function 212, staging function 231 and logical volume transfer function 232 can be realized.

(II) Storage Control Method of Embodiment

Next, the storage control method of the embodiment will be described with reference to FIGS. 3 to 6.

Figure 3:
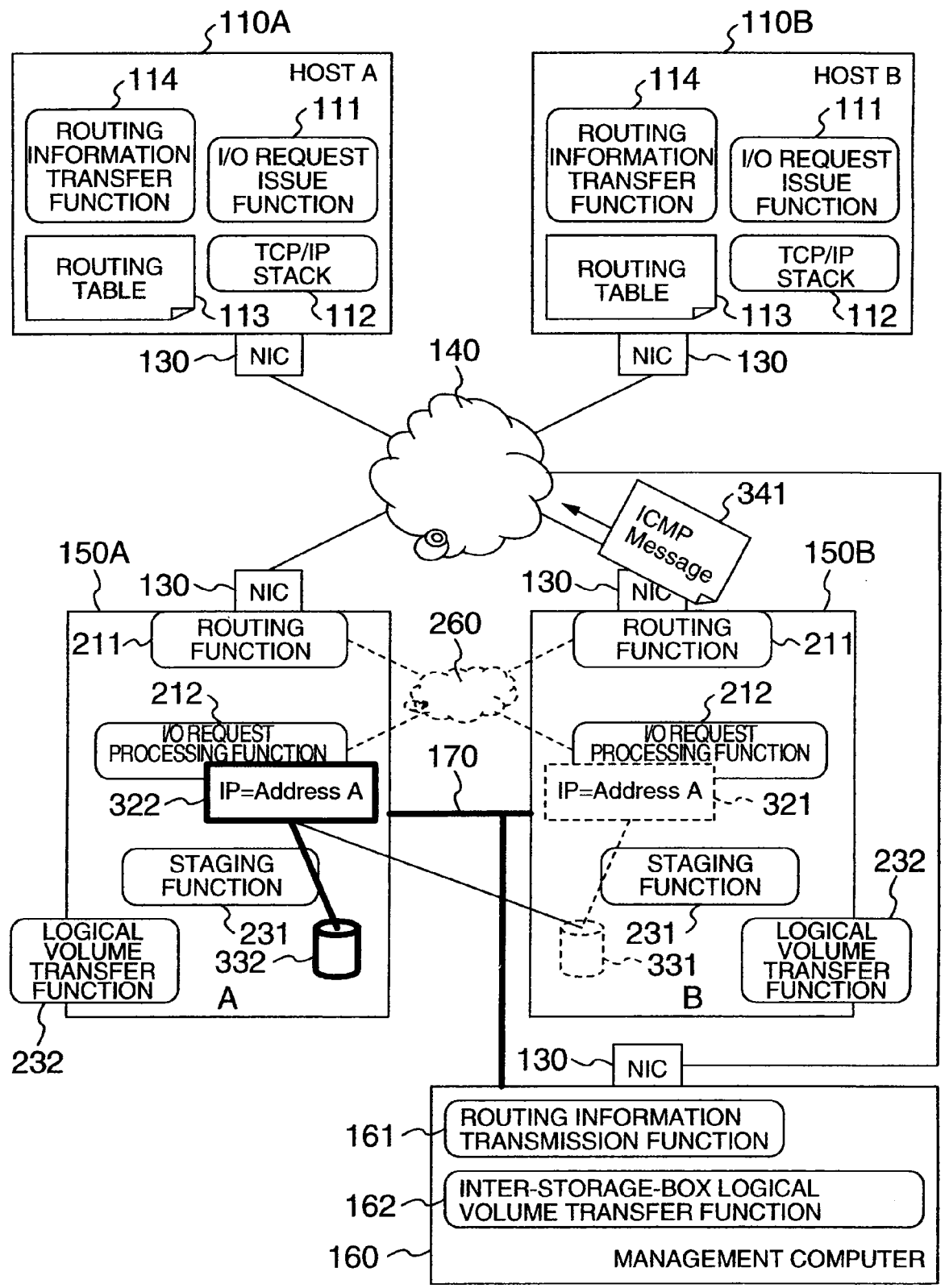
FIG. 3 is a schematic diagram illustrating a storage control method according to an embodiment of the invention.

According to the storage control method of the embodiment, as shown in FIG. 3, in an information processing system having a storage system 100 with storage boxes and hosts 110 connected by a network, when a logical volume in the storage box 150 is transferred, a communication path of the network is also changed.

It is assumed that a logical volume whose data exists in a storage area B 331 of a storage box B 150B is transferred to a storage box A 150A. It is also assumed that the logical volume is being accessed by a host A 110A and its IP address is Address A.

In this embodiment, the protocol to be used by the host 110 and storage box are assumed to be the TCP/IP protocol or iSCSI protocol.

In this example, although it is assumed that one IP address correspond to one logical volume, one IP address may correspond to a plurality of logical volumes or a plurality of IP addresses may correspond to one logical volume.

First, with reference to FIG. 4, a correspondence with an IP address and a logical volume will be described.

Data traffics during storage accesses are calculated and displayed by using chains of graph theory, where the chain is a part of a non-oriented graph that consists of vertices, each of which means IP address or logical volume, and edges each of which means relationship between certain IP address and certain logical volume. The each edge is drawn between a vertex that means certain IP address (named IPADDR) and certain vertex that means logical volume (named LVOL) if LVOL is accessible via IPADDR.

Figure 4A:
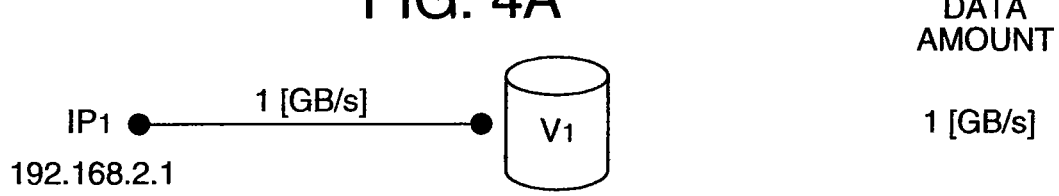
FIGS. 4A to 4C are schematic diagrams showing the correspondence between an IP address and a logical volume.

FIG. 4A shows one-to-one correspondence between an IP address and a logical volume. A data amount per time of storage access to a logical volume $V_1$ via $IP_1$ is 1 GB/s.

Figure 4B:
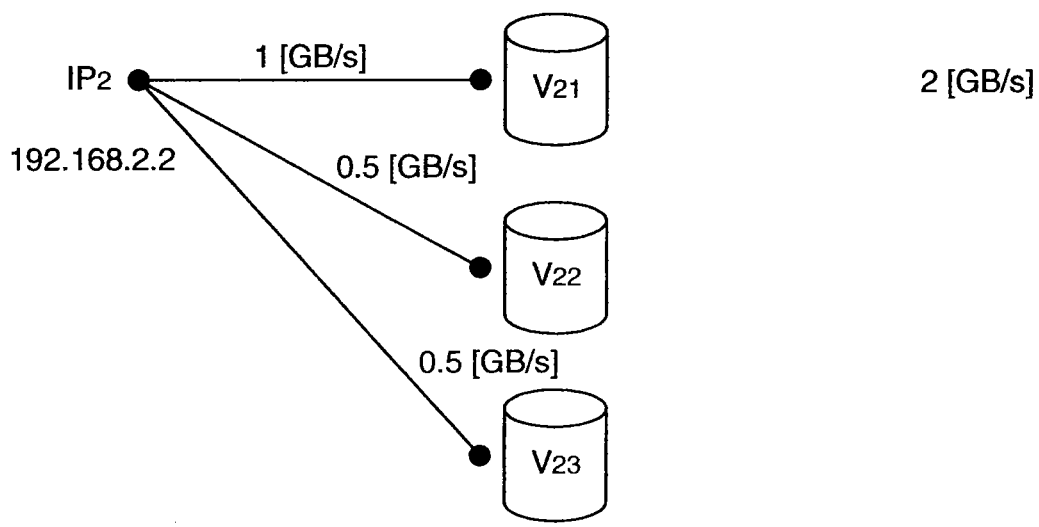

FIG. 4B shows one-to-multi correspondence between an IP address and logical volumes. A data amount per time of storage access to logical volumes $V_{21}$, $V_{22}$ and $V_{23}$ via $IP_2$ is 2 GB/s which is the sum of the data amounts for the logical volumes.

Figure 4C:
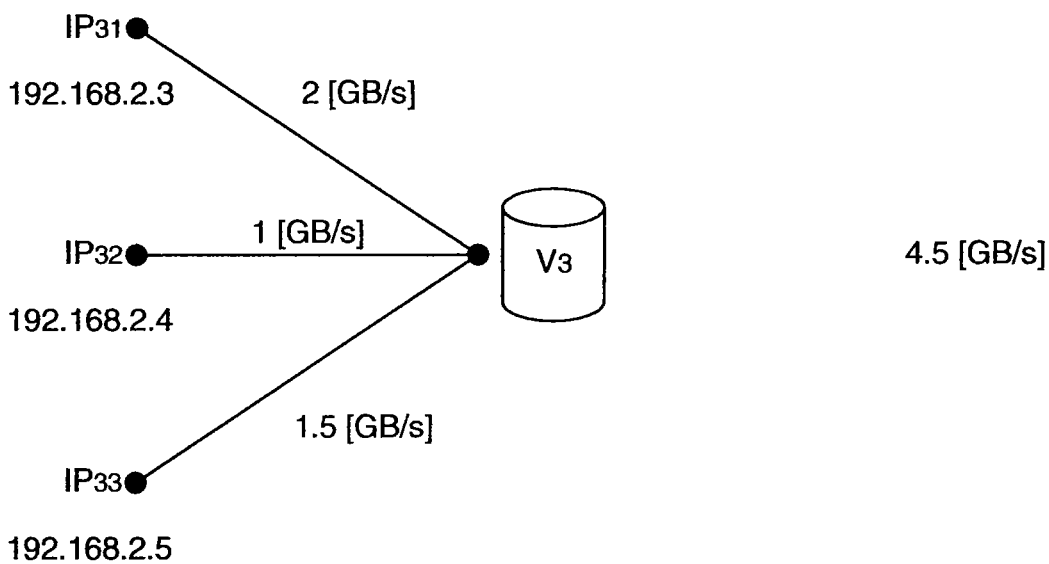

FIG. 4C shows multi-to-one correspondence between IP addresses and a logical volume. A data amount per time of storage access to a logical volume $V_3$ via $IP_{31}$, $IP_{32}$ and $IP_{33}$ is 4.5 GB/s which is the sum of the data amounts for the IP addresses.

Multi-to-multi correspondence between IP addresses and logical volumes may be used by combining the types of FIGS. 4B and 4C.

When a logical volume is transferred, the data amount per time is desired to be level over the respective storage boxes.

Next, with reference to the flowchart shown in FIG. 5, the process to be performed by the system when a logical volume having an IP address of Address A is transferred.

(1) A logical volume having an IP Address Address A is transferred to another storage box.

First, prior to transferring a logical volume, the inter-storage-box logical volume transfer function 162 of the storage box arbitration function 160 triggers the I/O request processing function 212 of the storage box B 150B so that the I/O request processing function 212 transfers information necessary for network communications and SCSI processes to the I/O request processing function 212 of the storage box A 150A, the information including: TCP connection information and buffer data related to the Address A; an IP Address A sequence number of iSCSI; the status of a SCSI device; and the like (Step 1001).

The inter-storage-box logical volume transfer function 162 of the storage box arbitration function 160 instructs the routing functions 211 of the storage boxes A 150A and B 150B to transmit an IP datagram destined for Address A to the I/O request processing function 212 of the storage box A 150A (Step 1002).

Next, the routing of function 211 of the storage box B 150B starts transmitting an ICMP Redirect Error message defined by the IP protocol to the host A 110A in the response of receiving the IP datagram destined for Address A (Step 1003).

The ICMP Redirect Error message is usually used by the TCP/IP protocol. This message is used so that the host A 110A thereafter accesses the logical volume of Address A in the storage box A 150A.

(2) Next, the routing information transmission function 161 of the storage box arbitration function 160 transmits information of a route for the IP address Address A via the routing function 211 of the storage box A 150A to all hosts on the storage network 140 (Step 1004).

(3) Upon reception of the ICMP Redirect Error message, the host A 110A renews its routing table 113 to transmit thereafter an IP datagram destined for Address A via the routing function of the storage box A 150A (Step 105).

(4) Upon reception of the route information from the routing information transmission function 161, the host B 110B renews its routing table 113 to transmit thereafter an IP datagram destined for Address A via the routing function 211 of the storage box A 150A (Step 1006).

At this stage, an access request to the logical volume of Address A is temporarily stopped until Step 1007 is completed, so that a message of the TCP/IP protocol and a SCSI request from a host cannot be received. However, also in such a case, if transmission of a message of the TCP/IP protocol or a SCSI request from a host fails, a re-transmission process is performed so that after the logical volume is transferred, an access similar to that before the transfer is possible.

If the I/O request processing function 212 can access data in the cache 220 of another storage box 150 or can transfer information to and from DKP 230 of another storage box, an I/O request arrived at the I/O request processing function of the storage box A 150A before Step 1007 is completed may be processed in cooperation with the cache 220 and DKP of the storage box B 150B. In this case, even if an I/O request arrives at the storage box A 150A, the logical volume in the storage box B before transfer can be accessed.

(5) Lastly, the logical volume transfer function 232 transfers data stored in the storage area B 331 to a storage area A 332, and information that indicates an area where actual data of the logical volume of Address A is stored is changed from the storage area B 331 to the storage area A 332 (Step 1007).

In this manner, both the host A 110A and host B 110B access the storage box A 150A via the storage network 140 so that the network route is changed after the logical volume is transferred.

In this embodiment, for the renewal of the routing table of the host 110, the ICMP Redirect Error message and routing information transmission function 161 are used. However, the routing table 113 may be renewed by other methods.

In this case, even if an IP datagram destined for Address A arrives at the routing function 211 of the storage box B 150B after setting change of the routing function 211, the IP datagram is transferred to the I/O request processing function 212 of the storage box A 150A via the CHP TCP/IP network 260. Therefore, the requisites for the renewal of the routing table 113 are that setting of the respective hosts 110 is changed at the same time or independently by the applied method and that this change can be completed in a finite time. Information necessary for host authentication or cryptographic communications may be transferred at Step 1001 or Step 1007.

Next, the processes to be executed by the inter-storage-box logical volume transfer function 162 in the storage control method of the invention will be described with reference to FIG. 6.

Figure 6:
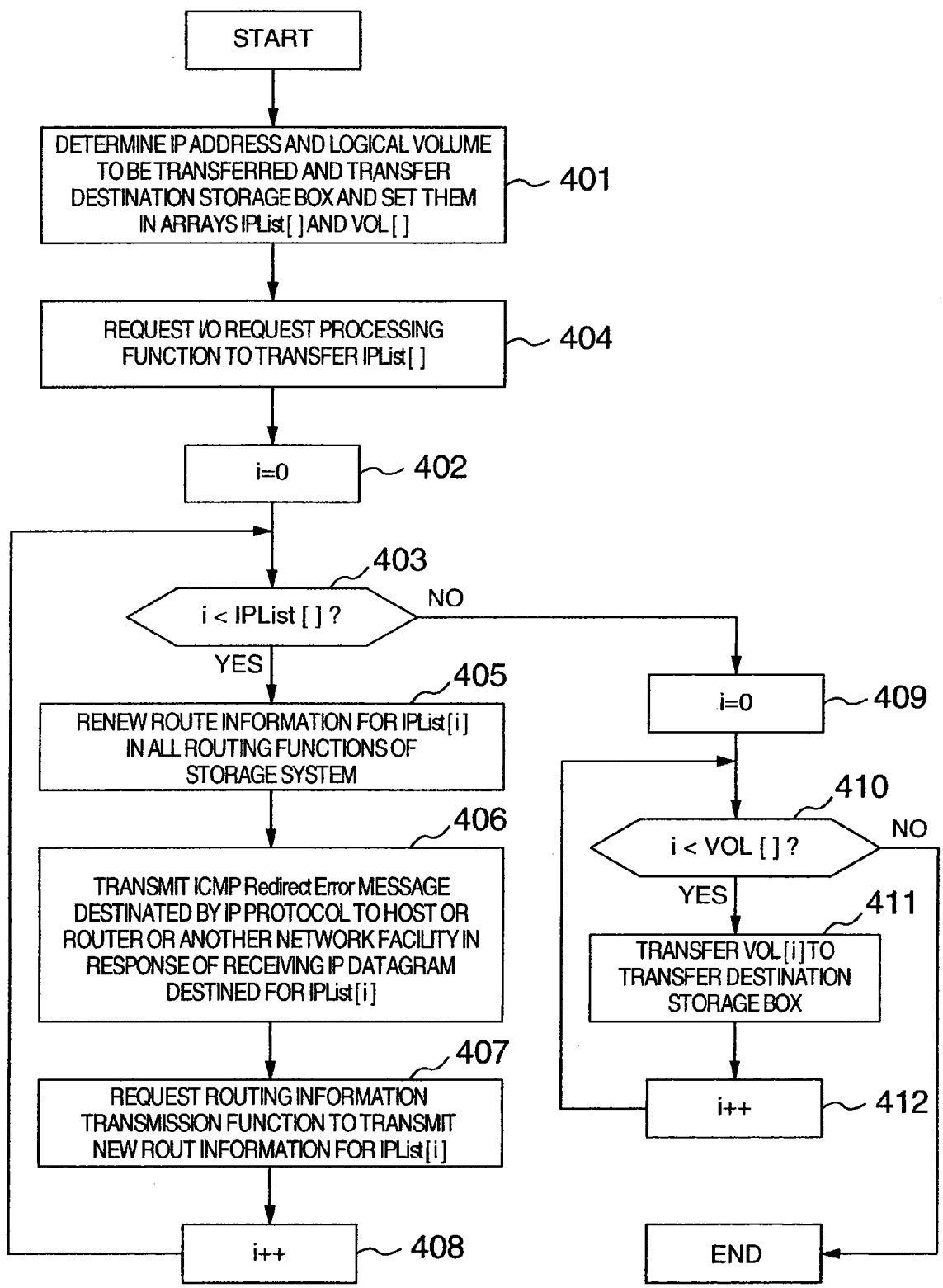
FIG. 6 is a flowchart illustrating the processes to be executed by an inter-storage-box logical volume transfer function 162.

The inter-storage-box logical volume transfer function 162 of DKP 230 has a function of controlling the whole storage system 100 performing a logical volume transfer method, and performs the following processes illustrated in the flowchart of FIG. 6.

(1) An IP address and logical volume to be transferred from a transfer source storage box 150 and a transfer destination storage box are determined and set in arrays IPList [ ] and VOL [ ] (Step 401).

The IPList [ ] and VOL [ ] should be selected to balance each value that means the total sum of the data amount access to the logical volume in a storage box 150. Namely, if a pair of the IPList [ ] and the VOL [ ] corresponds to a set of the chains in a graph destined in FIG. 4, the destination storage box 150 should not have a maximum said value in the storage system 100.

The arrays IPList [ ] and VOL [ ] may be determined by an administrator via a monitor screen, by external software to which API is publicized, or by other methods. In determining the arrays IPList [ ] and VOL [ ], all IP addresses and logical volumes constituting a chain indicating the correspondence between IP addresses and logical volumes shown in FIG. 4 are recommended or forced to be set in the arrays IPList [ ] and VOL [ ]. In this manner, the IP addresses and corresponding logical volumes always exist in one storage box 150, excepting the period while they are being transferred.

(2) Next, the I/O request processing function 212 is requested to transfer the IP address IPList [ ], the status of related all TCP connections and the status of iSCSI devices and SCSI devices to the I/O request processing function 212 of CHP 210 of the transfer destination (Step 404).

(3) 0 is set to a variable i (Step 402).

(4) If the variable i is smaller than the array IPList [ ], then the flow advances to Step 405, whereas if not, the flow branches to Step 409 (Step 403).

(5) Route information for the IP address IPList [i] is renewed to the I/O request processing function 212 of CHP 210 of the transfer destination and set to all the routing functions 211 in the storage system 100 (Step 405).

(6) The routing functions 211 of the storage box 150 except for the destination storage box 150 start forwarding an IP datagram destined for the IP Address IPList [i] to the I/O request processing function 212 of the CHP 210 of the destination storage box 150, and transmitting an ICMP Redirect Error message destined by the IP protocol to the host 110 or router or another facility in the response of receiving the IP datagram destined for the IPList [i] (Step 406).

(7) The routing information transmission function 161 is instructed to transmit new route information in order to use the routing function 211 of CHP 210 of the transfer destination storage box 150 as a router when the host 110 sends an IP datagram to the IP address IPList [i] (Step 407).

(8) The variable i is incremented by 1 to thereafter return to Step 403 (Step 408). In FIG. 6, "i++" is a C language-like statement and means to increment i by 1.

(9) 0 is set to the variable i (Step 409).

(10) If the variable i is smaller than the array VOL [ ], the flow advances to Step 411, whereas if not, the flow is terminated (Step 410).

(11) The logical volume corresponding to VOL [i] is transferred to an unused storage area of the transfer destination storage box 150 (Step 411).

(12) The variable i is incremented by 1 to thereafter return to Step 410 (Step 412).

With the above processes, data stored in the logical volume is transferred to the transfer destination storage box.

Next, the process to be executed when the host 110 receives the ICMP Redirect Error message at Step 1005 will be described.

When the host 110 receives the ICMP Redirect Error message, the TCP/IP stack 112 of the host 110 alters the contents of the routing table 113 in the following manner.

(1) A communication destination IP address DestIP and a corresponding new router IP address RtrIP are derived from the received ICMP Redirect Error message.

(2) An entry of the routing table 113 corresponding to DestIP is renewed or added to set RtrIP.

Next, the process to be executed when the host 110 received TCP/IP route information at Step 1006 will be described.

When the host 110 receives TCP/IP route information of the routing protocol typically OSPF, RIP and the like, the routing information transfer function 114 changes data in or adds data to the routing table 113 in accordance with the received route information.

Figure 7:
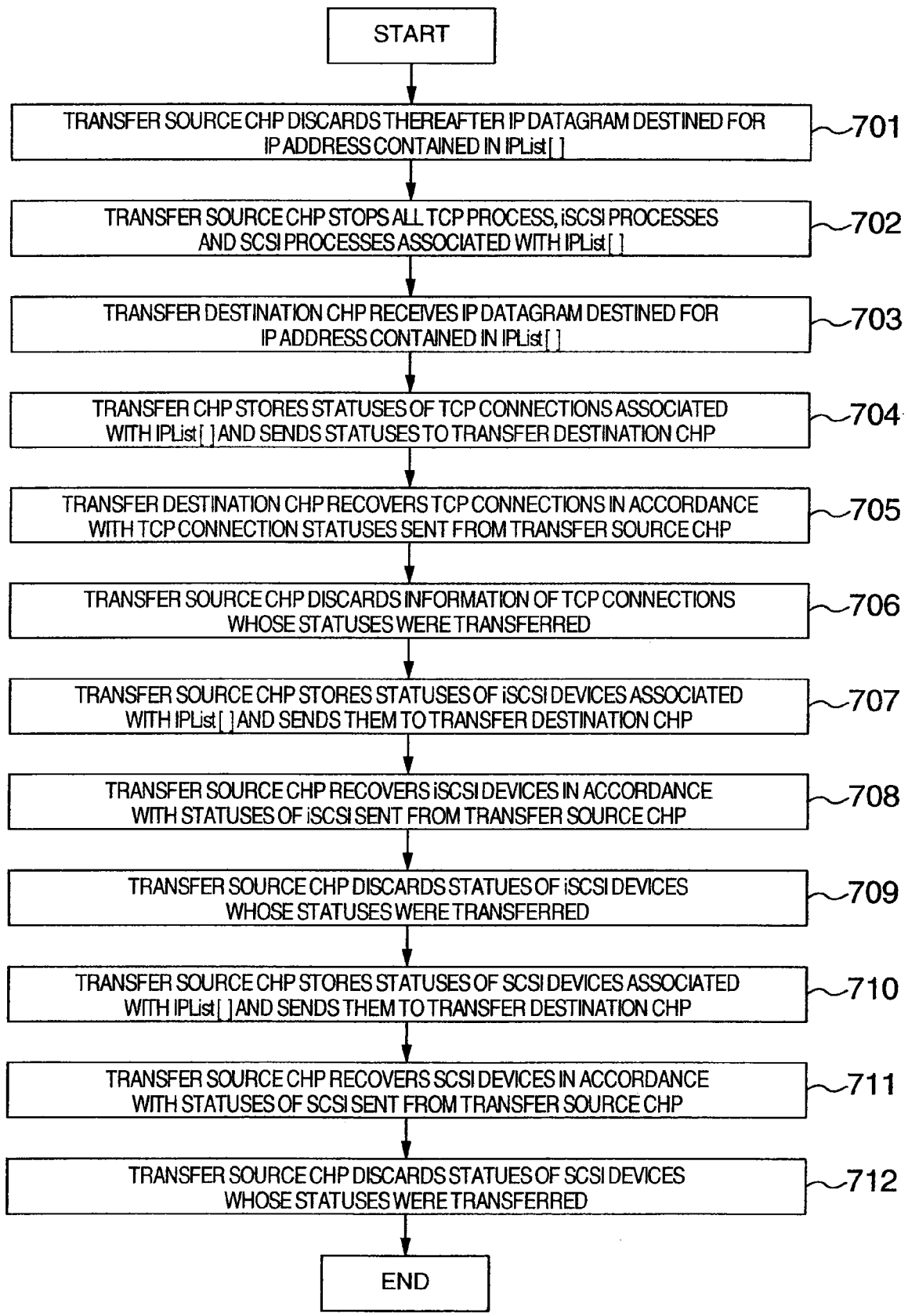
FIG. 7 is a flowchart illustrating a process of transferring communication information and I/O information related to an IP address, the process being executed by an I/O request processing function 212.

Next, with reference to FIG. 7, the process to be executed at Step 1001 when the I/O request processing function 212 transfers communication information and I/O information related to the IP address will be described.

The I/O request processing function 212 of CHP 210 transfers a set of IP addresses, the status of related TCP connections and the status of iSCSI devices and SCSI devices in the manner described below.

The SCSI device is a virtual device for processing SCSI commands. The iSCSI device is a virtual device which performs a control of a log-in process and the like and a transfer of SCSI commands necessary for communications in conformity with the iSCSI specifications. The iSCSI device derives SCSI commands and data from a PDU (Protocol Data Unit) of iSCSI transmitted via one or more TCP connections, and transfers them to the SCSI device. The iSCSI device also sets a process result by the SCSI device to PDU and transmits PDU via one or more TCP connections. The iSCSI device is in one-to-one correspondence with the SCSI device.

(1) The I/O request processing function 212 of CHP 210 of the transfer source storage box 150 (hereinafter abbreviated to "transfer source CHP 210") discards an arrived IP datagram destined for the IP address contained in IPList [ ]. IPList [ ] is an array of transfer IP addresses passed at Step 404 shown in FIG. 6 (Step 701).

(2) The transfer source CHP 210 prepares for the transfer of statuses by intercepting all TCP connections established by IP addresses contained in IPList [ ] and the processes of all iSCSI devices using the TCP connections and corresponding SCSI devices (Step 702).

(3) The I/O request processing function 212 of CHP 210 of the transfer destination storage box 150 (hereinafter abbreviated to "transfer destination CHP 210") starts to receive all IP datagrams destined for IP addresses contained in IPList [ ] (Step 703).

If necessary, the TCP stack of the I/O request processing function 212 may be set to discard an arrived IP datagram destined for the IP address contained in IPList [ ], without returning a specific message to the transmission source.

(4) The transfer source CHP 210 stores the statuses of all TCP connections established by using IP addresses contained in IPList [ ] and transmits the statuses to the transfer destination CHP 210 (Step 704). According to the TCP/IP protocol standards, it is necessary to store, as the status of a TCP connection, at least the IP address and port number of CHP 210, the IP address and port number of the host 110, a current sequence number and an urgency pointer, and the contents of a send buffer and a receive buffer in CHP 210.

(5) In accordance with the statuses of TCP connections sent from the transfer source CHP 210, the transfer destination CHP 210 recovers TCP connections and resumes transmission/reception processes for the TCP connections (Step 705).

At this Step, if the discard setting is made at Step 703 for discarding the IP datagram destined for the IP address contained in IPList [ ], this setting may be released.

(6) The transfer source CHP 210 discards the information of the TCP connections already transferred (Step 706).

(7) The transfer source CHP 210 stores the statuses of iSCSI devices which use TCP connections established by IP addresses contained in IPList [ ], and sends the statuses to the transfer destination CHP 210 (Step 707). According to the iSCSI protocol standards, it is necessary to store, as the status of each iSCSI device, at least the IP address and port number of the host using TCP connections, the IP address and port number of CHP 210, current values of various sequence numbers defined by iSCSI, and information exchanged with the host 110 during an iSCSI log-in.

(8) In accordance with the statuses of iSCSI devices sent from the transfer source CHP 210, the transfer destination CHP 210 recovers iSCSI devices and starts receiving an iSCSI PDU. If a PDU containing a SCSI command is received, a SCSI response "Busy" meaning a re-transmission of an I/O request from the host 110 may be set to a PDU which is returned (Step 708).

(9) The transfer source CHP 210 discards the statuses of iSCSI devices already transferred (Step 709).

(10) The transfer source CHP 210 stores the statuses of SCSI devices corresponding to the iSCSI devices which use TCP connections established by IP addresses contained in IPList [ ], and sends the statuses to the transfer destination CHP 210 (Step 710).

(11) In accordance with the statuses of SCSI devices sent from the transfer source CHP 210, the transfer destination CHP 210 recovers SCSI devices and starts receiving a SCSI command (Step 711). At this Step, if setting of returning a SCSI response "Busy" is made at Step 708, setting of each iSCSI device is altered to pass a SCSI command to the iSCSI device.

(12) The transfer source CHP 210 discards the statuses of SCSI devices already transferred (Step 712).

Information necessary for authentication and cryptography may be transferred by a transfer process for a software stack which performs authentication and cryptograph processes. For example, in the case of SSL (Secure Socket Layer), since the authentication and cryptography function is positioned at the intermediate between the TCP stack and iSCSI devices, SSL information is transferred together with the information of iSCSI devices. In the case of IPSec, since the function is positioned in the IP stack, information of IPSec is transferred at Step 701 and Step 703.

A modification of the embodiment according to the invention will be described with reference to FIGS. 8 to 12.

In the above-described embodiment, in order to notify the host of the transfer of a logical volume among storage boxes, the ICMP Redirect Error message is used.

In this modification, instead of the ICMP Redirect Error message, the ARP protocol is used. ARP is a general protocol usable by the TCP/IP protocol, and translates a communication partner IP address into a MAC address.

(I) Structure of Storage System of Modification.

Figure 8:
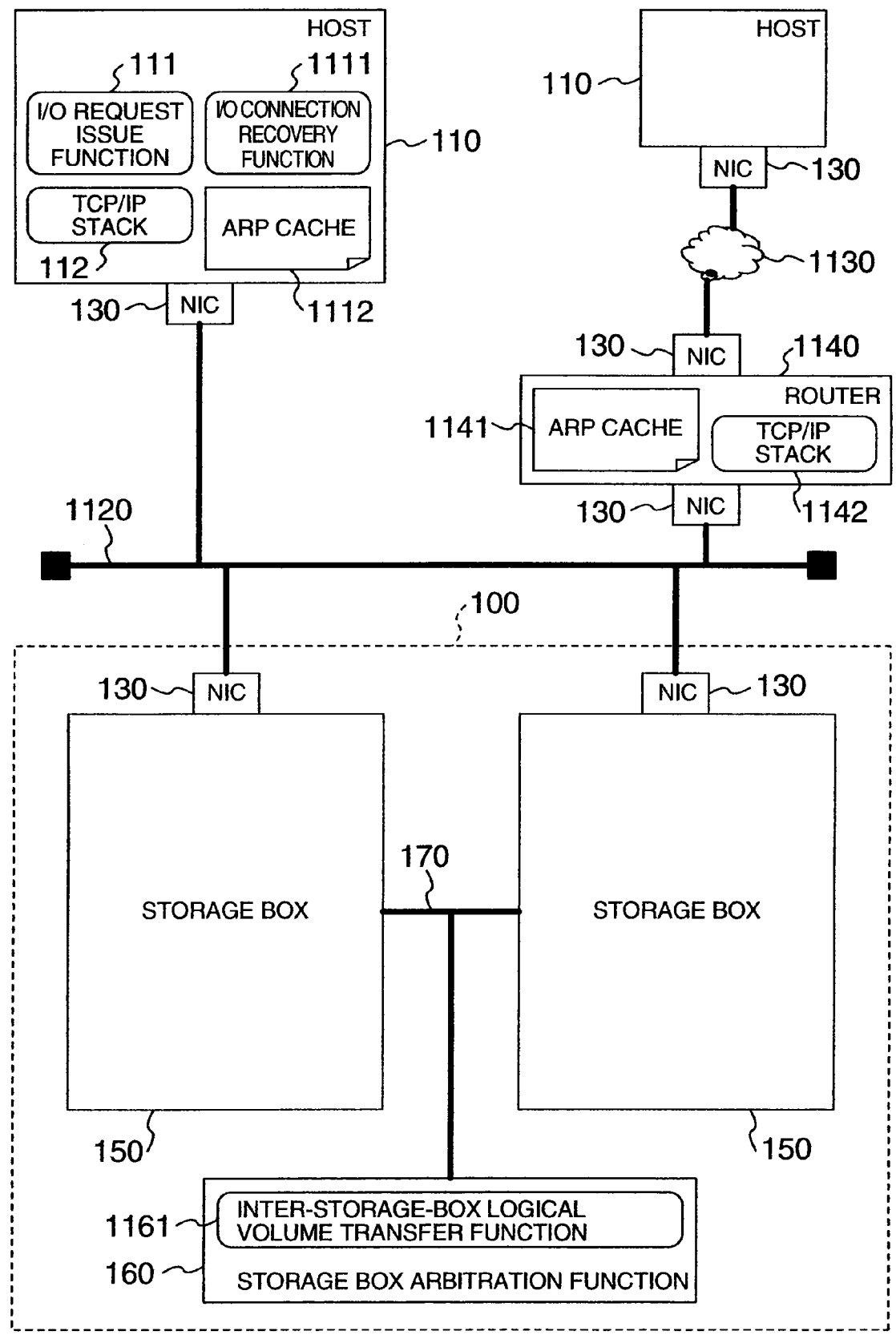
FIG. 8 is a diagram showing the overall structure of an information processing system using a storage system according to a modification of the embodiment of the invention.

FIG. 8 is a diagram showing the overall structure of an information processing system using a storage system of this modification.

Figure 9:
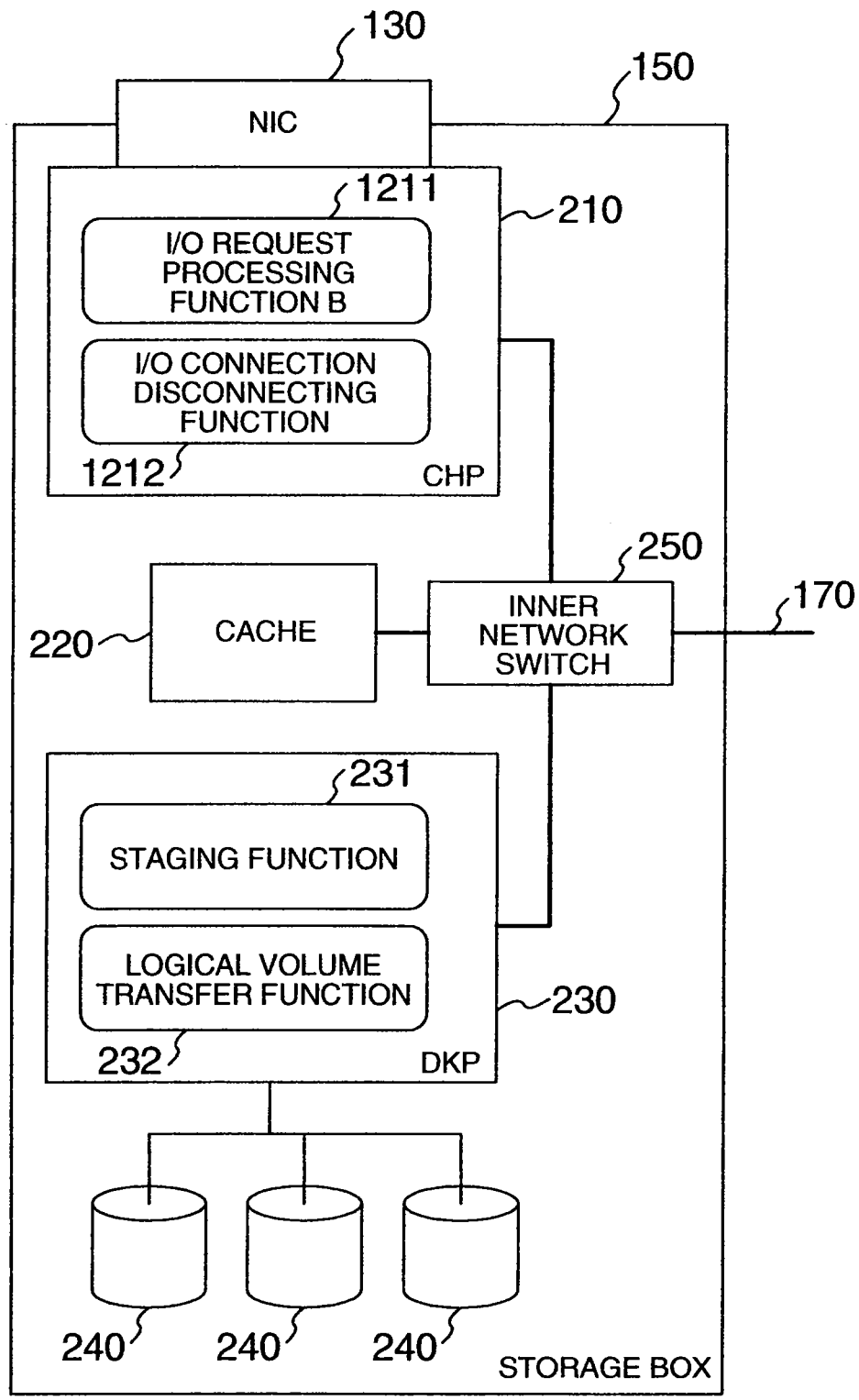
FIG. 9 is a diagram showing the structure of a storage box constituting the storage system according to the modification of the embodiment.

FIG. 9 is a diagram showing the structure of a storage box constituting the storage system of the modification.

Similar to the above-described embodiment, the modification also uses the structure that hosts and the storage system are interconnected by a network. However, in order to realize the communication function by ARP, the structures of the host 110 and storage system 100 and the network configuration are different from the embodiment.

In place of the routing table 113 and routing information reception function of the host 110 of the embodiment, the host 110 of the modification has an ARP cache 1112 and an I/O connection recovery function 1111.

An inter-storage-box logical volume transfer function B 1161 of the modification is different from the inter-storage-box logical volume transfer function in the storage system arbitration function 160 of the embodiment.

The storage network 140 of the embodiment is constituted of a local network segment 1120, a router 1140 and a network 1130.

An I/O connection recovery function 1111 of the host 110 is a function of reestablishing an I/O connection when it is disconnected from the storage system 100.

The ARP cache 1112 stores correspondence information of IP addresses of communication partner network apparatuses and MAC addresses in order to avoid frequent occurrences of ARP requests for inquiring MAC addresses.

For communications among the hosts 110, router 1140 and storage system 100 connected to the local network segment 1120 by TCP/IP, it is always required that information of a MAC address corresponding to an IP address exists in the ARP cache. If it does not exist, information of the MAC address corresponding to the IP address is registered in the ARP cache by using the ARP protocol. The contents of the ARP cache may be set by a method other than ARP, e.g., by directly setting data by an administrator of the host 110 or by automatically deleting data not used for a predetermined time.

The local network segment 1120 is a network via which the storage system 100 and host 110 can directly communicate without the involvement of the router 1140, by obtaining a MAC address from the IP address. The network 1130 communicates with the storage system via the router 1140.

The router 1140 is a communication apparatus for exchanging an IP datagram between the local network segment 1120 and the network 1130, and has a TCP/IP stack 1142 and an ARP cache 1141. In FIG. 8, although one router 1140 is connected between the local network segment 1120 and network 1130, a plurality of routers 1140 may be connected to the local network segment 1120.

As shown in FIG. 9, the storage box 150 of the modification has an I/O connection disconnecting function 1212 and an I/O request processing function B 1211 in place of the routing function 211 and I/O request processing function 212 of the embodiment.

Although the I/O request processing function B 1211 of the modification has generally the same function as that of the I/O request processing function 212, the IP address transfer method is different.

The I/O connection disconnecting function 1212 is a function of forcibly disconnecting a current I/O connection and discarding the intermediate contents being processed by the I/O request processing function B 1211. In the case of iSCSI, although the disconnection of an I/O connection may be a disconnection of a TCP connection, the I/O connection may be disconnected by another method.

Communications between CHPs 210 of different storage boxes 150 may be made by using the inner storage network 170 or by using the local network segment 1120 and NICs 130. Communications between DKPs 230 of different storage boxes 150 may be made by using the inner storage network 170 or by using the local network segment 1120, NICs 130 and CHPs 210.

(II) Storage Control Method of Modification

Next, the storage control method of the modification will be described with reference to FIGS. 10 to 12

Figure 10:
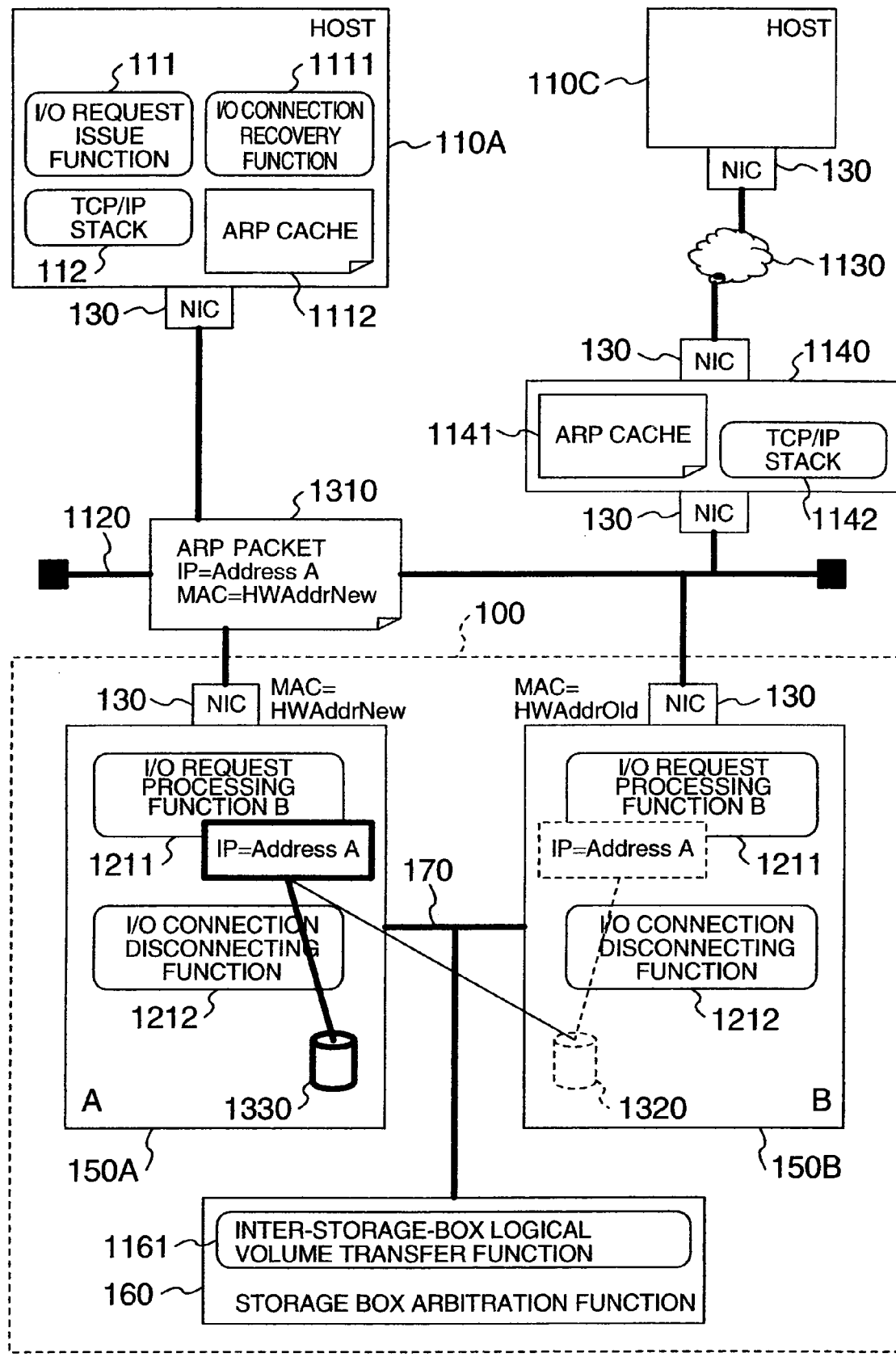
FIG. 10 is a schematic diagram illustrating a storage control method according to the modification.

According to the storage control method of modification, as shown in FIG. 10, in an information processing system having a storage system 100 with storage boxes 150 and hosts 110 connected by the network, when a logical volume in the storage box 150 is transferred, a communication path of the network is also changed.

Also in this modification, similar to the embodiment described earlier, it is assumed that a logical volume whose data exists in a storage area B 1320 of a storage box B 150B is transferred to a storage box A 150A. It is also assumed that the logical volume is being accessed by a host A 110A and its IP address is Address A.

Also in this modification, although it is assumed that one IP address corresponds to one logical volume, one IP address may correspond to a plurality of logical volumes or a plurality of IP addresses may correspond to one logical volume.

Next, the processes to be executed by the system when a logical volume is transferred in this modification will be described.

In this example, a logical volume having an IP address Address A is transferred to another storage box. It is assumed that a MAC address of NIC 130 of the storage box A 150A is HWAddrNew and a MAC address of NIC 130 of the storage box B 150 B is HWAddrOld.

(1) First, the I/O connection disconnecting function 1212 of the storage box B 150B disconnects the I/O connections established for the IP address Address A. The I/O connection recovery functions 1111 of the host A 110A and host C 110C start to recover the I/O connections. If the logical volume transfer function 232 has a pre-process executable without disconnecting the I/O connection, the pre-process may be executed prior to disconnection.

(2) Next, the I/O request processing function B 1211 of the storage box B 150B transfers IP addresses, iSCSI device information and SCSI device information all related to Address A to the I/O request processing function B 1211 of the storage box A 150A.

(3) Next, a logical volume transfer process is executed.

(4) The storage box A 150A broadcasts an ARP packet 1310 to the local network segment 1120 to notify the host 110A and router 1140 of that the MAC address of the IP address Address A is HWAddrNew.

(5) By the operation of the I/O connection recovery function, the I/O connections between the storage box A 150A and the host A 110A and the host C 110C are established. The I/O process starts thereafter.

Next, the process to be executed by the inter-storage-box logical volume transfer function B 1161 to control the transfer of a logical volume among storage boxes will be described.

(1) First, similar to Step 401 shown in FIG. 6, the IP address and logical volume to be transferred and the transfer destination storage box 150 are determined.

(2) The I/O connection disconnecting function 1212 of the transfer source storage box 150 is requested to disconnect the I/O connections established for the IP address determined to be transferred at Step 1801 and not to perform communications using the IP address determined to be transferred. If the logical volume transfer function 232 has a pre-process executable without disconnecting the I/O connection, the pre-process may be executed prior to disconnection.

(3) The I/O request processing functions B 1211 of the transfer source and transfer destination storage boxes 150 are requested to transfer the IP address determined to be transferred at previous step (1) in the description of the inter-storage-box logical volume transfer function B 1161 and related iSCSI device information and SCSI information.

(4) Next, the inter-storage-box logical volume transfer function 162 is requested to execute a logical volume transfer process.

(5) The transfer destination I/O request processing function B 1211 is requested to broadcast an ARP packet to the local network segment 1120, the ARP packet indicating that the MAC address HWAddrNew of NIC 130 of the transfer destination storage box 150 corresponds to the IP address determined at Step 1801, and communications using a new IP address is permitted.

Next, description is made for a process of adding data to or altering data in the ARP cache to be executed when the TCP/IP stack 112 of the host 110 receives the ARP packet 1310. This process is also applied to the router 1140.

(1) The TCP/IP stack 112 of the host 110 derives the IP address and corresponding MAC address from the received ARP packet 1310.

(2) A combination of the derived IP address and MAC address is added to the ARP cache 1112, or if the MAC address corresponding to the IP address is already registered, this MAC address is renewed to the new MAC address.

The operation to be performed by the I/O connection recovery function 1111 of the host 110 will be described with reference to FIG. 11.

Figure 11:
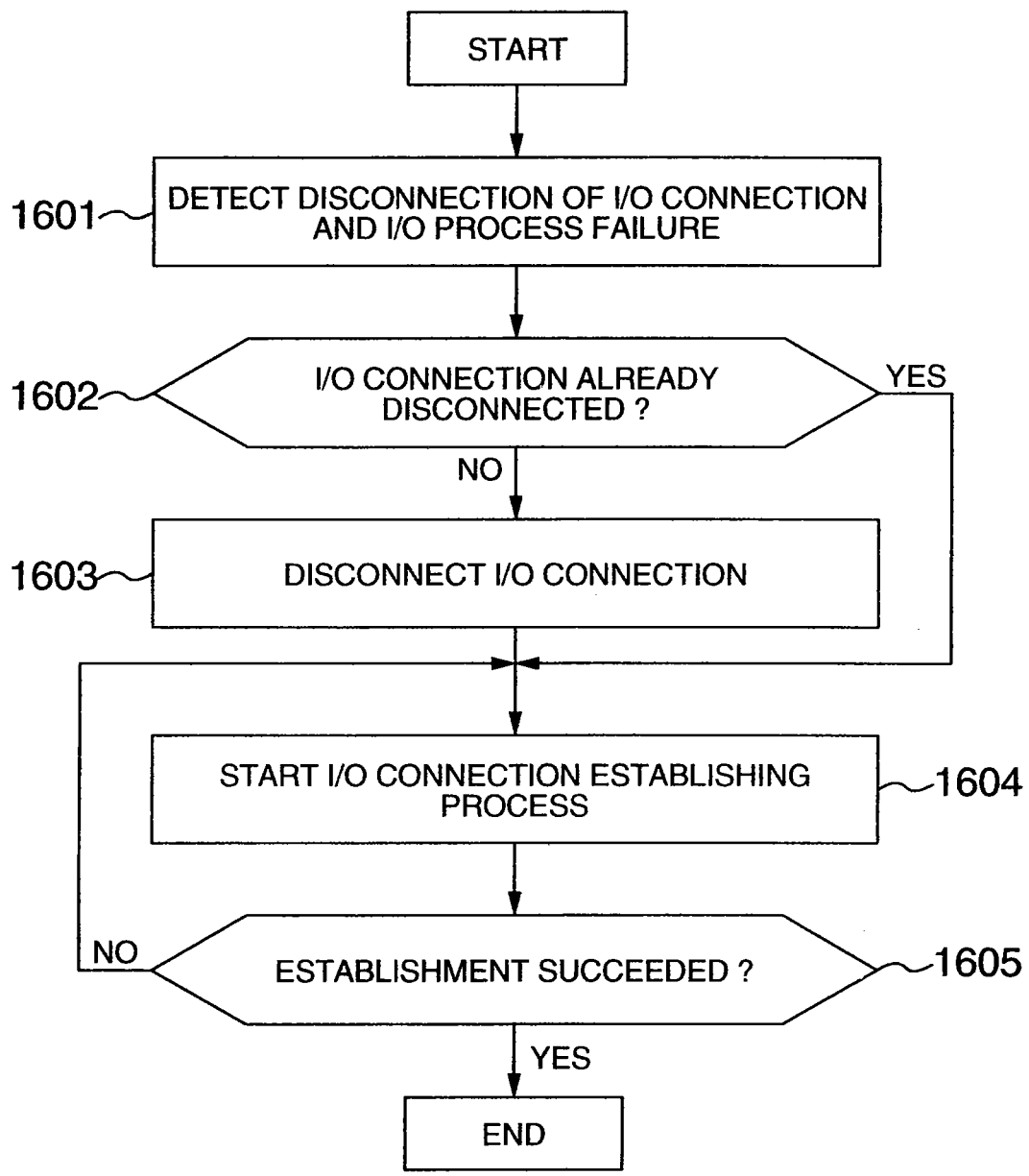
FIG. 11 is a flowchart illustrating an I/O connection recovery process to be executed by an I/O connection recovery function 1111 of a host 110.

FIG. 11 is a flowchart illustrating an I/O connection recovery process to be executed by the I/O connection recovery function 1111 of the host 110.

(1) First, the I/O connection recovery function 1111 of the host 110 detects a disconnection of an I/O connection or a failure of an I/O process. Since iSCSI uses TCP as the transport layer, a disconnection detection may be performed by requesting the TCP/IP stack 112 to confirm the status of a TCP session. An I/O process failure detection may be performed by confirming the status of the I/O request issue function 111 (Step 1601).

(2) If the corresponding I/O connection is in a connection state, a disconnection process is performed (Step 1602, Step 1603).

(3) An establishment process is repeated until an I/O connection to the storage system 100 is established (Step 1604, Step 1605).

Figure 12:
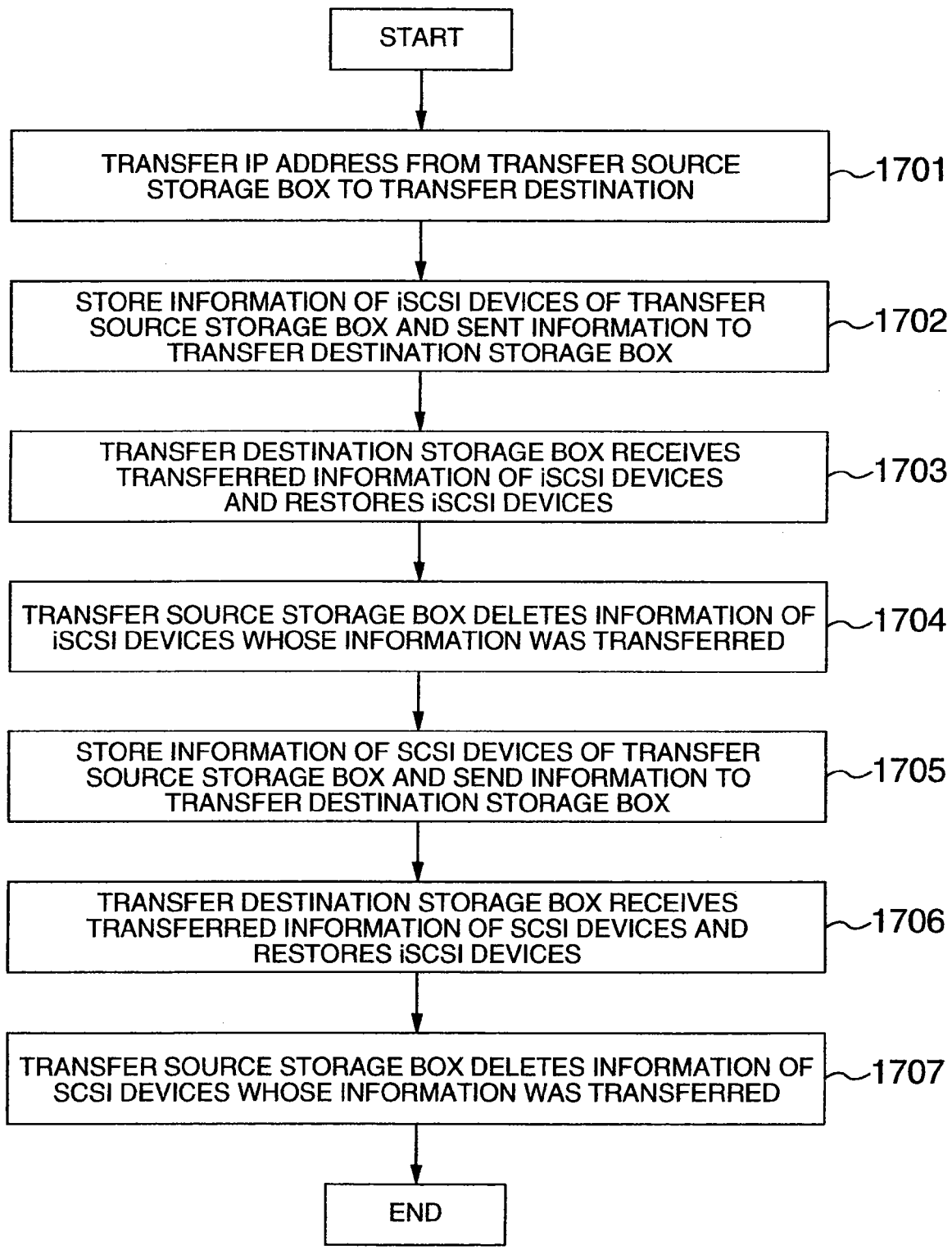
FIG. 12 is a flowchart illustrating a process of transferring an IP address and related iSCSI device information and SCSI device information, the process being executed by an I/O request processing function B 1211 of a storage box 150.

Next, with reference to the flowchart of FIG. 12, description is made for a process of transferring an IP address and related iSCSI device information and SCSI device information to be executed by the I/O request processing function B 1211 of the storage box 150.

(1) First, use setting of the IP address to be transferred is deleted from the I/O request processing function B 1211 of the CHP 210 of the transfer source storage box 150, and new use setting of the IP address is added to the I/O request processing function B 1211 of the CHP 210 of the transfer destination storage box 150 (Step 1701).

(2) The transfer source I/O request processing function B 1211 stores the information of iSCSI devices related to the IP address to be transferred, and sends the information to the transfer destination I/O request processing function B 1211 (Step 1702).

(3) In accordance with the information sent at Step 1702, the transfer destination I/O request processing function B 1211 recovers the iSCSI devices (Step 1703).

(4) Next, the transfer source I/O request processing function B 1211 deletes the information of the iSCSI devices already transferred (Step 1704).

(5) The transfer source I/O request processing function B 1211 stores the information of SCSI devices related to the IP address to be transferred, and sends the information to the transfer destination I/O request processing function B 1211 (Step 1705).

(6) In accordance with the information sent at Step 1705, the transfer destination I/O request processing function B 1211 recovers the SCSI devices (Step 1706).

(7) Next, the transfer source I/O request processing function B 1211 deletes the information of the iSCSI devices already transferred (Step 1707).

If the transfer destination storage box 150 can recover the information of iSCSI and SCSI devices or has this information, the transfer source storage box 150 is not necessary to store the information.

Information necessary for authentication and cryptography is transferred by a transfer process for a software stack which performs authentication and cryptograph processes. For example, in the case of SSL (Secure Socket Layer), since the authentication and cryptography function is positioned at the intermediate between the TCP stack and iSCSI processing unit, SSL information is transferred together with the information of iSCSI devices. In the case of IPSec, since the function is positioned in the IP stack, information of IPSec is transferred at Step 1701 and Step 1703.

Another modification of the embodiment will be described with reference to FIGS. 13 and 14.

Figure 13:
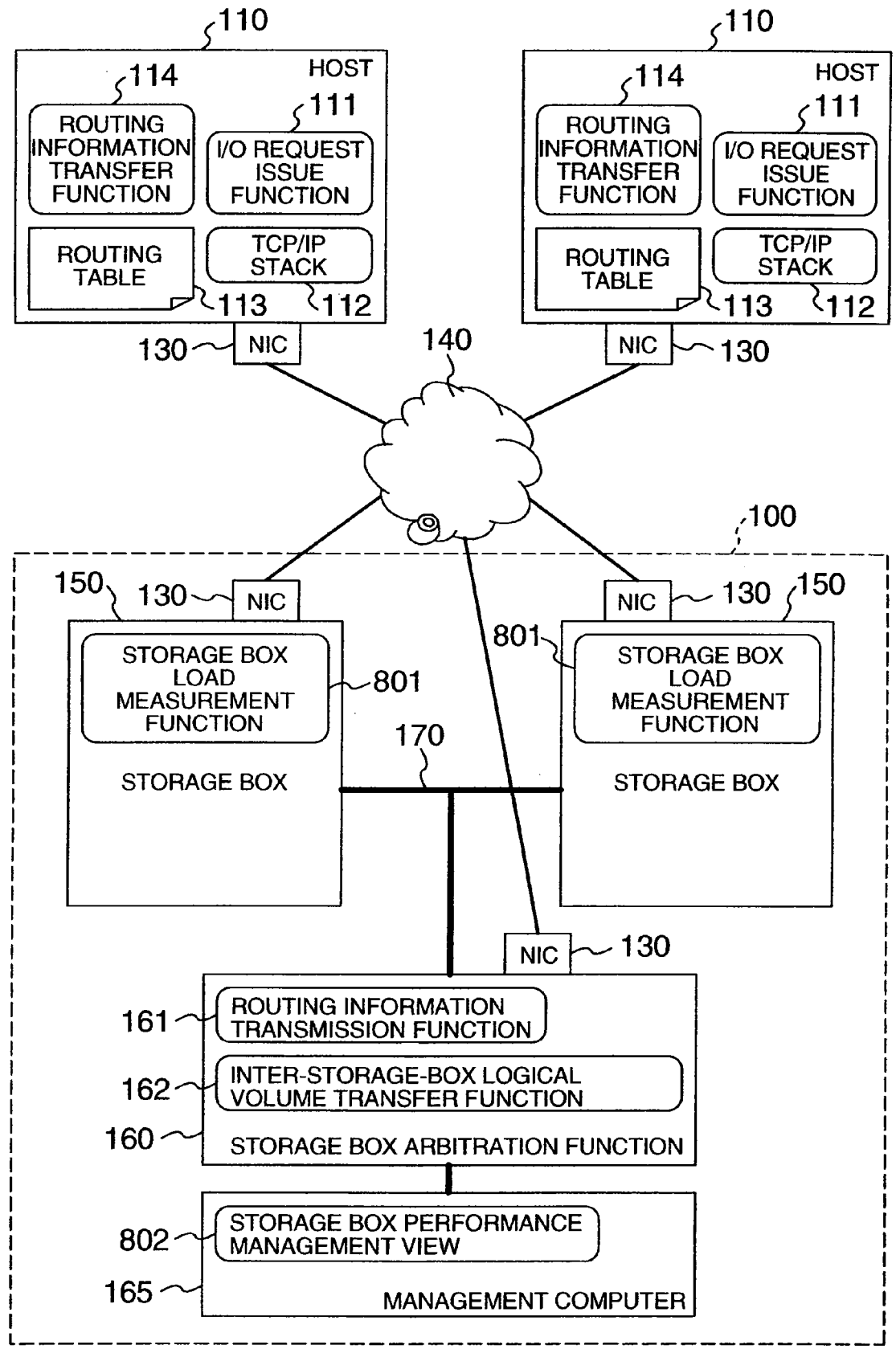
FIG. 13 is a diagram showing the overall structure of an information processing system using a storage system according to another modification of the invention.

FIG. 13 is a diagram showing the overall structure of an information processing system using a storage system according to another modification of the invention.

Figure 14:
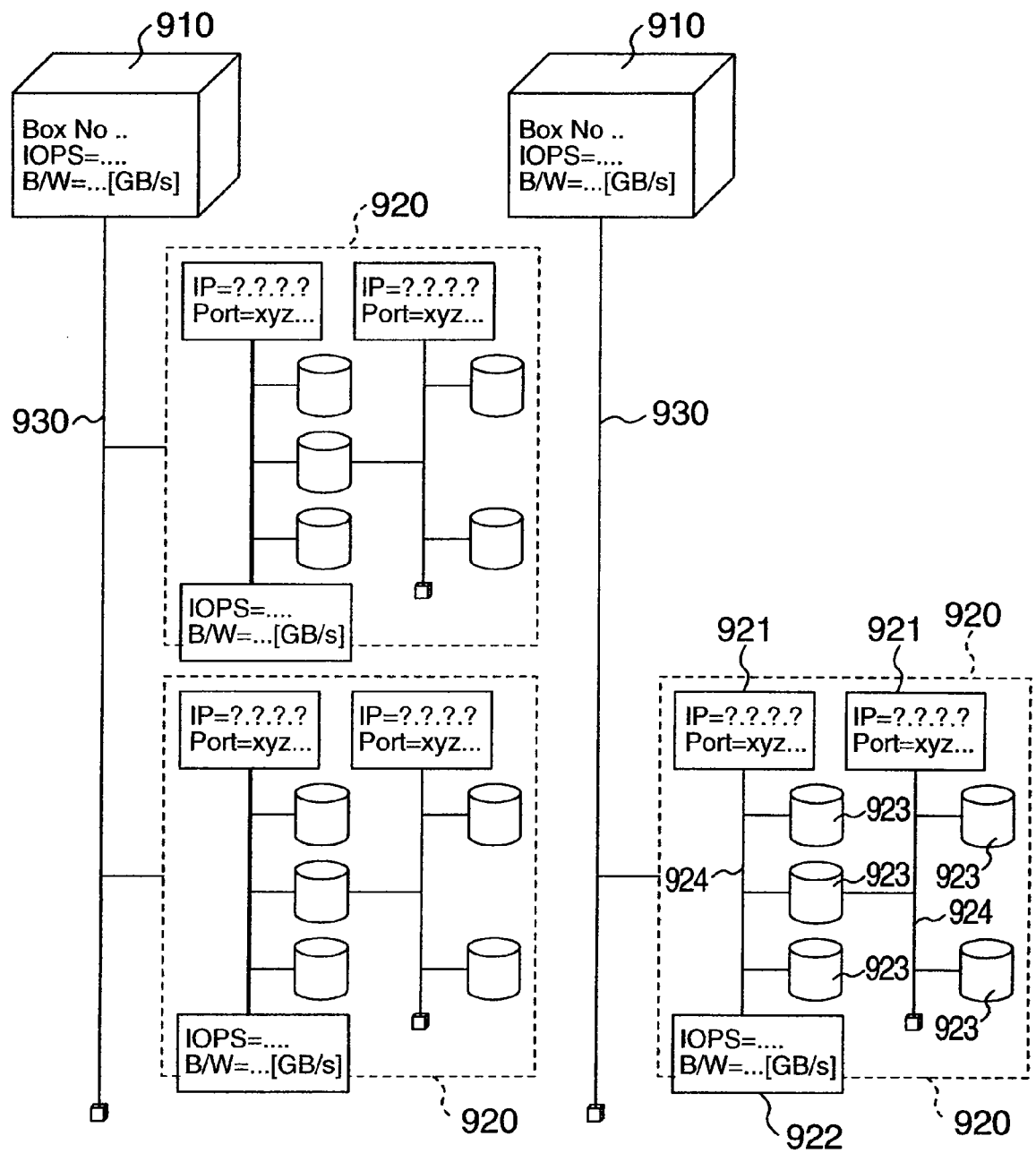
FIG. 14 is a schematic diagram of a GUI view, a storage box performance management view 802 of a management computer 165.

FIG. 14 is a schematic diagram showing a GUI view, storage box performance management view 802 of a management computer 165.

Similar to the embodiment, in this modification, hosts 110 and storage boxes 150 communicate each another by using the iSCSI protocol. This modification has some additional functions. These functions may be applied to the previously described modification.

Each storage box 150 is added with a storage box load measuring function 801 and a storage box performance management view 802 of a management computer 165.

Similar to the embodiment, the storage box 150 can transfer a logical volume and a network route can be switched. The storage box arbitration function 160 may provide the functions of the management computer 165.

The storage box load measuring function 801 of the storage box 150 is a function of measuring the load states of CHP 210, cache 220 and DKP 230. Measurement items of the storage box load measuring function 801 include the number of IP processes (IOPS) of DKP per unit time for each logical volume, a cache hit rate for each logical volume, an IP address of CHP, the IOPS and bandwidth of CHP for each port address, and the like.

The storage box performance management view 802 displays the load states measured by the storage box load measuring function 801 and sends an instruction entered by an administrator through the view to the inter-storage-box logical volume transfer function 162.

Next, with reference to FIG. 14, the storage box performance management view 802 of the management computer 165 will be described.

The storage box performance management view 802 has storage box icons 910, IP-logical volume chains 920, lines 930.

The storage box icon 910 shows the storage box 150. In this icon, the name of the storage box 150 and character strings indicating the load states of the storage box 150 are displayed. The character strings indicating the load states include the number of I/O requests processed by the storage box 150 per unit time, a bandwidth, a total load and an average load of CHP 210 and DKP 230 of the storage box 150 upon the storage device 240, and the like.

The line 930 interconnects combinations of IP addresses and port numbers included in each IP-logical chain 920 and the storage box icon 910 corresponding to the storage box 150 including logical volumes.

The IP-logical volume chain 920 is constituted of an IP-port number icon 921, a load state display area 922, logical volume icons 923 and a line 924. This graphical chain shows the correspondence chain related to IP addresses and logical volumes described with FIG. 4 in a manner visually easy to understand. The graphical chain is a set of icons and lines representative of a chain of the non-oriented graph of IP addresses and logical volumes. The IP-logical volume non-oriented graph has, as the vertices of the graph, all combinations of IP addresses and port numbers and logical volumes in the storage system 100, and the edges of the graph between each combination of the IP address and port number belonging to the set and the logical volume accessible by using the combination.

The IP-port number icon 921 shows a combination of an IP address and port number supplied from the storage system 110 to the host 100.

Displayed in the load state display area 922 is the load state of each part typically the logical volume represented by an icon in the IP-logical volume chain 920. The character strings indicating the load states include the number of I/O requests per unit time processed for each part belonging to the IP-logical volume chain 920, a bandwidth, the number of I/O requests processed by CHP 210 per unit time for each combination of the IP address and port number belonging to the IP-logical volume chain 920, a bandwidth, a total load and an average load of the storage unit 240, and the like.

The logical volume icon 923 shows a logical volume included in the IP-logical volume chain 920.

The line 924 interconnects icons to indicate that a combination of the IP address and port number can access a corresponding logical volume.

With this view, an administrator of the storage system 100 can confirm the load state in the chain unit or transfer basic unit in order to reduce the data amount transmitting over the CHP TCP/IP network 260.

For example, if the administrator judges that the load of the storage box indicated by the left icon is large, the IP-logical volume chain 920 connected to the left icon can be transferred to the storage box indicated by the right icon through a drag-and-drop operation.

The management computer 165 sends this transfer operation to the inter-storage-box logical volume transfer function 162 to actually transfer the logical volume.

A logical volume may be automatically transferred upon detection of the load state.

By using the management view of this modification, an administrator of the storage system 100 grasps the load state for a set of IP addresses and logical volumes which is principally a transfer basic unit. This load state is compared with a load of the storage box 150. It is therefore easy to judge which set of IP addresses and logical volumes is transferred from a high load storage box 150 to a low load storage box 150.

As described in this modification, the logical volume transfer function 232 selects a high load logical volume and transfers it to another storage box so that the storage system 100 can solve unbalanced loads among the storage boxes 150.

According to the invention, a large scale storage system constituted of a plurality of storage boxes can be provided which has a function of avoiding unbalanced loads among storage boxes.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system coupled to a computer via a network, the storage system comprising:
a plurality of storage subsystems including a first storage subsystem and a second storage subsystem;
wherein the first storage subsystem includes a plurality of first storage devices and a first controller providing one or more first logical volumes and one or more second logical volumes, which are configured on the first storage devices of the computer;
wherein the second storage subsystem includes a plurality of second storage devices and a second controller;
wherein a first IP address corresponds to the one or more first logical volumes and a second IP address corresponds to the one or more second logical volumes;
wherein, when the first controller migrates the one or more first logical volumes from the first storage subsystem to the second storage subsystem, the first controller transfers information regarding the first IP address with first data stored in the one or more first logical volumes to the second controller of the second storage subsystem, after which the second controller provides the one or more migrated first logical volumes, which are configured on the second storage devices, with the first IP address to the computer.

2. A storage system according to claim 1, wherein, when the first controller migrates the one or more first logical volumes to the second storage subsystem, the first controller further transfers information regarding SCSI device information related to the first IP address and the iSCSI device information related to the first IP address which are used as a network communication protocol.

3. A storage system according to claim 2, further comprising a controller coupled to the first storage subsystem and the second storage subsystem;
wherein each of the storage subsystems measures a load of input/output of each of the storage subsystems, and the controller collects the measured loads of each of the storage subsystems, identifies the one or more first logical volumes in accordance with the collected loads of each of the storage subsystems, and changes the network route to the one or more first logical volumes from the first storage subsystem to the second storage subsystem.

4. A storage system according to claim 3, wherein the controller instructs to transfer the information regarding the first IP address with the first data stored in the first logical volume to the second storage subsystem.

5. A storage system coupled to a computer, the storage system comprising:
a first storage subsystem including a plurality of first storage devices and a first controller providing one or more first logical volumes and one or more second logical volumes, which are configured on the first storage devices of the computer;
a second storage subsystem including a plurality of second storage devices and a second controller;
wherein a first IP address corresponds to the one or more first logical volumes and a second IP address corresponds to the one or more second logical volumes;
wherein, when the first controller migrates the one or more first logical volumes from the first storage subsystem to the second storage subsystem, the first controller transfers information regarding the first IP address with first data stored in the one or more first logical volumes to the second controller of the second storage subsystem, after which the second controller provides the one or more migrated first logical volumes, which are configured on the second storage devices, with the first IP address to the computer.

6. A storage system according to claim 5, wherein, when the first controller migrates the one or more first logical volumes from the first storage subsystem to the second storage subsystem, the first controller further transfers information regarding SCSI device information related to the first IP address and the iSCSI device information related to the first IP address which are used as a network communication protocol.

7. A storage subsystem according to claim 6, wherein the controller instructs to transfer the information regarding the first IP address with the first data stored in the one or more first logical volumes to the second storage Subsystem.

8. A storage system according to claim 5, wherein an access from the computer to the first storage subsystem and the second storage subsystem is performed by using iSCSI protocol.

9. A storage system according to claim 5, wherein the first controller transfers the first data to the second storage subsystem after transferring the information regarding the first IP address to the second storage subsystem.

10. A storage system according to claim 5, wherein when the first controller sends an error message to the computer after transferring the information regarding the first IP address to the second storage subsystem.

11. A storage system comprising:
the first storage subsystem including a plurality of first storage devices and a first controller managing one or more first logical volumes with a first IP address and one or more second logical volumes with a second IP address the one Or more first logical volumes and the one or more second logical volumes which are configured on the plurality of first storage devices; and
the second storage subsystem including a plurality of second storage devices and a second controller,
wherein, when the one or more first logical volumes is migrated from the first storage subsystem to the second storage subsystem the first controller in the first storage subsystem transfers information regarding the first IP address with first data stored in the one or more first logical volumes to the second controller of the second storage subsystem, after which the second controller in the second subsystem manages the one or more migrated first logical volumes, which are configured on the plurality of second storage devices with the first IP address.

12. A storage system according to claim 11, wherein, when the first controller migrates the one or more first logical volumes from the first storage subsystem to the second storage subsystem, the first controller further transfers information regarding SCSI device information related to the first IP address and the iSCSI device information related to the first IP address, which are used as a network communication protocol.

13. A storage system according to claim 12, wherein the controller instructs to transfer the information regarding the first IP address with the first data stored in the one or more first logical volume to the second storage subsystem.

14. A storage system according to claim 11, wherein the first storage subsystem and the second storage subsystem are coupled to a computer, wherein an access from the computer to the first storage subsystem and the second storage subsystem is performed by using iSCSI protocol.

15. A storage system according to claim 11, wherein the first controller transfers the first data to the second storage subsystem after transferring the information regarding the first IP address to the second storage subsystem.

16. A storage system according to claim 11,
wherein the first storage subsystem and the second storage subsystem are coupled to a computer,
wherein when the first controller sends an error message to the computer after transferring the information regarding the first IP address to the second storage subsystem.

* * * * *